US009720602B1

(12) United States Patent
Chen et al.

(10) Patent No.: US 9,720,602 B1
(45) Date of Patent: Aug. 1, 2017

(54) DATA TRANSFERS IN COLUMNAR DATA SYSTEMS

(71) Applicant: International Business Machines Corporation, Armonk, NY (US)

(72) Inventors: Xing Chen, Beijing (CN); Paul C. Huffman, Lively (CA); David C. Kalmuk, Toronto (CA); Sam S. Lightstone, Toronto (CA); Shaorong Liu, Wilmette, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/169,774

(22) Filed: Jun. 1, 2016

(51) Int. Cl.
*G06F 3/00* (2006.01)
*G06F 3/06* (2006.01)
*G06F 17/30* (2006.01)

(52) U.S. Cl.
CPC .......... *G06F 3/0611* (2013.01); *G06F 3/0613* (2013.01); *G06F 3/0656* (2013.01); *G06F 3/0689* (2013.01); *G06F 17/30315* (2013.01); *G06F 17/30339* (2013.01)

(58) Field of Classification Search
CPC ................................................ G06F 17/30315
See application file for complete search history.

(56) References Cited

U.S. PATENT DOCUMENTS

| | | |
|---|---|---|
| 5,938,763 A | 8/1999 | Fimoff et al. |
| 7,966,343 B2 | 6/2011 | Yang et al. |
| 8,108,361 B2 | 1/2012 | Netz et al. |
| 8,468,151 B2 | 6/2013 | Branscome et al. |
| 8,521,788 B2 | 8/2013 | Ellison et al. |
| 8,682,853 B2 | 3/2014 | Zane et al. |
| 8,862,625 B2 | 10/2014 | Meiyyappan et al. |
| 8,914,353 B2 | 12/2014 | Dees et al. |

(Continued)

OTHER PUBLICATIONS

Deshpande, Hrishikesh Arun, "Efficient Compression Techniques for an In Memory Database System", International Journal of Innovative Research in Computer and Communication Engineering, (An ISO 3297: 2007 Certified Organization), vol. 3, Issue 9, Sep. 2015, Copyright to IJIRCCE, 9 pages.

(Continued)

*Primary Examiner* — Zachary K Huson
(74) *Attorney, Agent, or Firm* — Steven F. McDaniel

(57) ABSTRACT

A computer-implemented method includes receiving a request to transmit column group data to a target node, the column group data comprising C columns within a column-oriented data table and determining a transmission row count R for transmitting the column group data to the target node. The method may also include transmitting a transmission packet comprising R sequentially-ordered data elements for each of the C columns to the target node. The R data elements for each column may be sequentially retrieved from memory. A corresponding method includes receiving, at a target node, a request to receive the column group data, determining the transmission row count R for receiving the column group data, and receiving a transmission packet comprising R sequentially-ordered data elements for each of the C columns and storing the sequentially-ordered data elements within memory. A corresponding computer system and corresponding computer program products are also disclosed herein.

20 Claims, 6 Drawing Sheets

(56) References Cited

U.S. PATENT DOCUMENTS

| | | | |
|---|---|---|---|
| 2011/0302583 A1 | 12/2011 | Abadi et al. | |
| 2013/0138761 A1* | 5/2013 | Vasudevan | H04L 65/605 709/213 |
| 2013/0205028 A1 | 8/2013 | Crockett et al. | |
| 2013/0290300 A1 | 10/2013 | Chen et al. | |
| 2014/0372389 A1 | 12/2014 | Barber et al. | |
| 2015/0178305 A1 | 6/2015 | Mueller et al. | |
| 2015/0213072 A1 | 7/2015 | Chen et al. | |
| 2016/0171075 A1* | 6/2016 | Erenrich | G06F 17/30598 707/738 |
| 2016/0253382 A1* | 9/2016 | Shadmon | G06F 17/30442 |

OTHER PUBLICATIONS

Devulapalli, Sai, "Why MPP-based Analytical Databases Are Still Key for Enterprises", Big Data, Oct. 16, 2014, 5 pages, <https://blog.pivotal.io/big-data-pivotal/products/why-mpp-based-analytical-databases-are-still-key-for-enterprises>.

Dipalma, Drew, "What is Azure SQL Data Warehouse?", Last updated: Feb. 25, 2016, 5 pages, <https://azure.microsoft.com/en-gb/documentation/articles/sql-data-warehouse-overview-what-is/>.

IBM, "What's New in dashDB", IBM®, Modified date: Feb. 18, 2016, "Grace Period Disclosure", 6 pages, <http://www-01.ibm.com/support/docview.wss?uid=swg21961758>.

Klopp, Rob, "Who is How Columnar? Exadata, Teradata, and HANA—Part 1: Column Compression", Database Fog Blog, Jul. 1, 2013, 4 pages, <http://skylandtech.net/2013/07/01/who-is-how-columnar-exadata-teradata-and-hana-part-1-column-compression/>.

Linstedt, Dan, E., "VLDB: Column Based versus Row Based", BeyeNETWORK, Posted Sep. 21, 2008, 3 pages, <http://www.b-eye-network.com/blogs/linstedt/archives/2008/09/vldb_column_bas.php>.

Mokhtar, Mostafa, "TPC-H Column Store and MPP systems", Published on Mar. 31, 2014, SlideShare Explore Search You, in®, 16 pages, <http://www.slideshare.net/MostafaMokhtar1/tpch-column-store-and-mpp>.

Srinivasan, Sudershan, "Data Modeling", Applying Relevant Data Modeling Techniques to MPP Columnar Stores—A Point of View, Sapient® Global Markets, A Sapient Case Study © Sapient Corporation 2014, 36 pages.

Wikipedia, "Sybase IQ", From Wikipedia, the free encyclopedia, This page was last modified on Feb. 11, 2016, 6 pages, <https://en.wikipedia.org/wiki/Sybase_IQ>.

"Data Encoding and Compression", printed on Feb. 25, 2016, © 2006-2015 Hewlett-Packard Development Company, L.P., 1 page, <https://my.vertica.com/docs/7.1.x/HTML/Content/Authoring/ConceptsGuide/Components/DataEncodingAndCompression.htm>.

"Performance—Amazon Redshift", © 2016, Amazon Web Services, 2 pages, <http://docs.aws.amazon.com/redshift/latest/dg/c_challenges_achieving_high_performance_queries.html>.

"Aster Database: Compression", Teradata® Aster, Copyright © 2012 Teradata Corporation, 2 pages.

Chen et al., "Data Transfers in Columnar Data Systems", U.S. Appl. No. 15/584,320, filed May 2, 2017, 33 pages.

IBM Appendix P, list of patents and patent applications treated as related, flied herewith, 2 pages.

* cited by examiner

410A → | NODE A |  |  |  | NODE B |  | ← 410A
|---|---|---|---|---|---|---|
| Name | Age | Insured |  | Name | Age | Insured |
| Steve | 53 | Y |  | Mark | 35 | Y |
| Chen | 28 | N |  | Marie | 28 | Y |
| Julia | 30 | Y |  | Raj | 30 | N |
| Daniel | 34 | Y |  | Dave | 34 | Y |
| Priya | 39 | N |  | Li | 39 | N |
| Don | 45 | Y |  | Greg | 45 | N |
| Tony | 27 | Y |  | Roberto | 27 | Y |
| Nancy | 23 | Y |  | Dave | 51 | N |
| Jan | 42 | N |  | Yuki | 29 | Y |
FIG. 4A
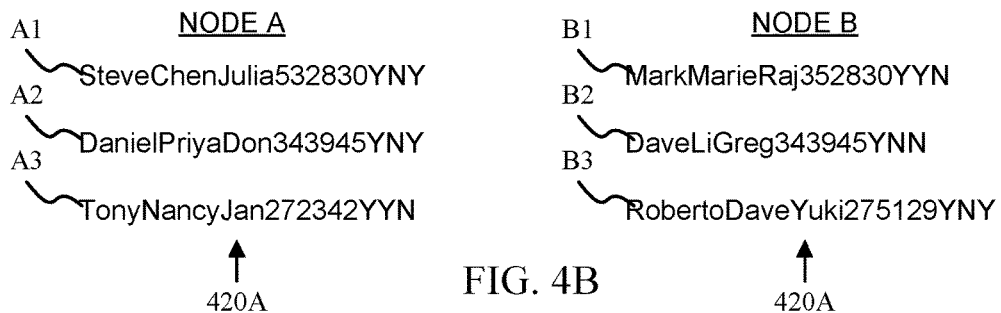
FIG. 4B
FIG. 4C

NODE C

| | Name | Age | Ins. | |
|---|---|---|---|---|
| B1 { | Mark | 35 | Y | ⎫ Processing |
| | Marie | 28 | Y | ⎬ Group 1 |
| | Raj | 30 | N | ⎭ |
| A1 { | Steve | 53 | Y | |
| | Chen | 28 | N | |
| | Julia | 30 | Y | ⎫ |
| A2 { | Dave | 34 | Y | ⎬ Processing |
| | Li | 39 | N | ⎬ Group 3 |
| | Greg | 45 | N | ⎭ |
| B2 { | Daniel | 34 | Y | |
| | Priya | 39 | N | ⎫ |
| | Don | 45 | Y | ⎬ Processing |
| A3 { | Tony | 27 | Y | ⎬ Group 3 |
| | Nancy | 23 | Y | ⎭ |
| | Jan | 42 | N | |
| B3 { | Roberto | 27 | Y | • |
| | Dave | 51 | N | • |
| | Yuki | 29 | Y | • |

FIG. 4D

DATA TRANSFERS IN COLUMNAR DATA SYSTEMS

BACKGROUND OF THE INVENTION

The present invention relates generally to data processing and more particularly to overlapping data transfers with data processing in columnar data processing and storage systems.

Columnar data systems typically store, retrieve, and process data in columns in order to increase data throughput. For example, in a columnar database, all of the data values for the first column are stored together followed by all of the data values for second column, and so forth. The data is typically stored in record order, such that the 100th entry for the first column and the 100th entry for second column belong to the same input record. Storing the data in columns enables retrieving selected data columns involved in a query (e.g., customer name and address) as a group, rather than accessing each record row-by-row and extracting the selected data columns from those records.

SUMMARY

A method, executed by one or more processors, includes receiving a request to transmit column group data to a target node, the column group data comprising C columns within a column-oriented data table and determining a transmission row count R for transmitting the column group data to the target node. The method may also include transmitting a transmission packet comprising R sequentially-ordered data elements for each of the C columns to the target node. The R data elements for each column may be sequentially retrieved from memory. A corresponding method includes receiving, at a target node, a request to receive the column group data, determining the transmission row count R for receiving the column group data, and receiving a transmission packet comprising R sequentially-ordered data elements for each of the C columns and storing the sequentially-ordered data elements within memory. A corresponding computer system and corresponding computer program products are also disclosed herein.

BRIEF DESCRIPTION OF THE DRAWINGS

FIGS. 4A-4D are text diagrams depicting one example of data processed in accordance with at least one embodiment of the present invention.

DETAILED DESCRIPTION

The embodiments disclosed herein recognize that exchanging or transferring columnar data in column-oriented data processing systems may result in significant processing overhead and delays. For example, sending a column group (e.g., work unit) to another node in a column-oriented data processing system may result in many costly cache misses on both the sending node and the target node if the column group is sent in row order. Additionally, stalled processing may occur on both the sending node and the target node if the column group is sent in row order. At least some of the embodiments disclosed herein address one or more of the above issues and enable data transfers that overlap with data processing.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages will become more fully apparent from the following drawings, description and appended claims, or may be learned by the practice of the invention as set forth hereinafter.

Figure 1:
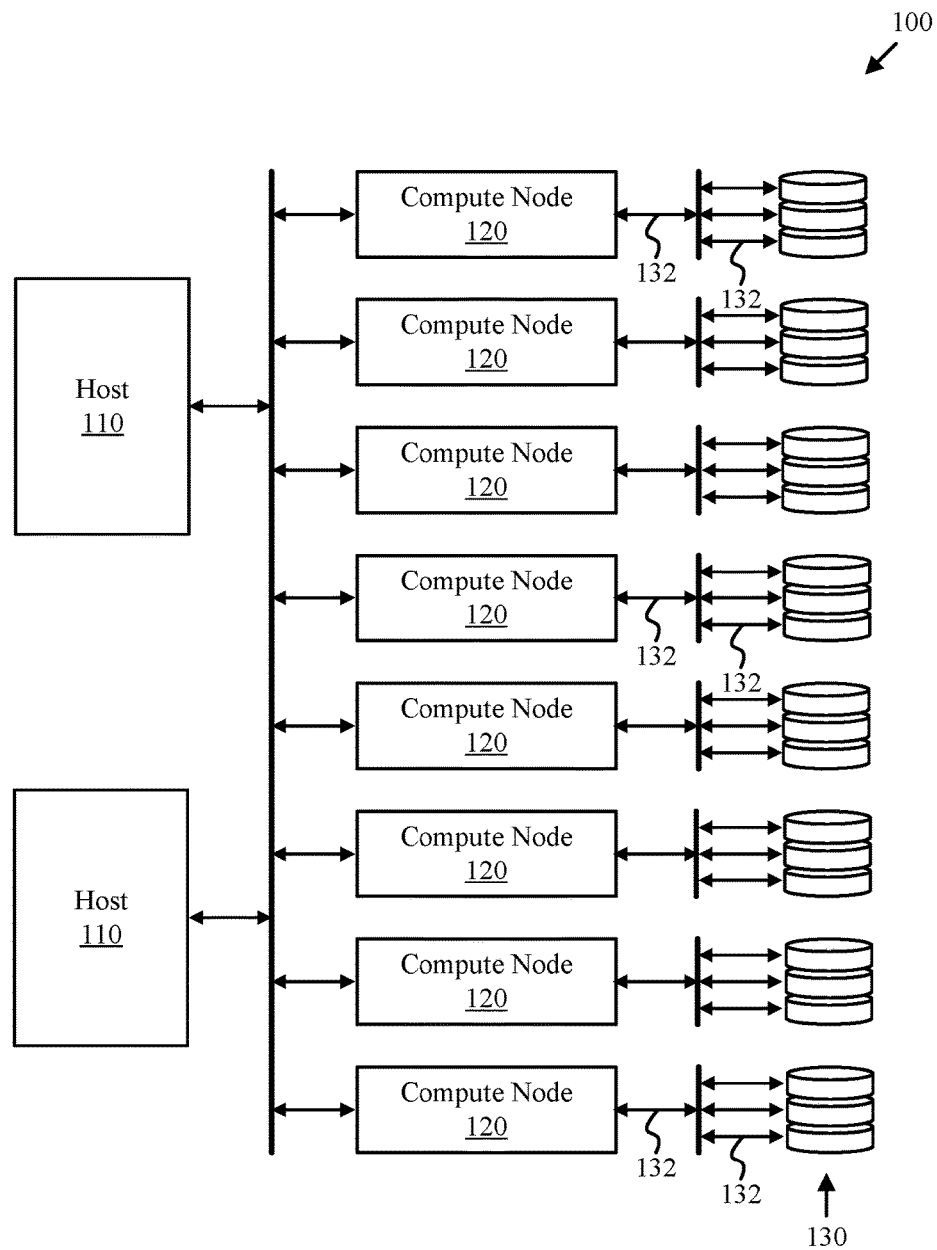
FIG. 1 is a block diagram depicting one example of a computing environment wherein at least one embodiment of the present invention may be deployed.

FIG. 1 is a block diagram depicting one example of a computing environment 100 wherein at least one embodiment of the present invention may be deployed. As depicted, the computing environment 100 includes one or more hosts 110, a set of compute nodes 120, and storage devices 130. The computing environment 100 may support massively parallel column-oriented processing of data.

The hosts 110 may delegate processing tasks to the compute nodes 120. The compute nodes 120 may execute the delegated tasks including conducting queries on column-oriented data stored on the storage devices 130. The storage devices 130 may be attached to specific compute nodes 120 via a high bandwidth interface 132 that facilitates high data rate transfers of column data to the compute nodes 120.

In some scenarios, each column of a column-oriented data table is replicated onto each set of storage devices 130 that correspond to the compute nodes 120. However, in many scenarios the set of storage devices 130 that correspond to particular compute nodes 120 are only required to process the columns needed for a particular query (i.e., a column group) that is delegated to the particular compute node 120.

In certain scenarios, a query is delegated to multiple compute nodes 120 and each of those nodes process a subset of the rows for a column group. For example, each computing node 120 within the computing environment 100 may be assigned particular sequential rows for a query that uses a column group. Consequently, each of the storage devices 130 corresponding to the assigned compute nodes 120 need only provide the rows in the column group that are needed for processing the assigned portion of the query.

As queries are processed, one issue that arises is that subsequent queries delegated to the compute nodes 120 may involve data that does not currently reside on the storage devices 130 dedicated to the assigned compute nodes 120 (including results data from previous queries). Consequently, data may need to be transferred between the compute nodes 120. The embodiments disclosed herein enable transfers of such column-oriented data in a manner that enables overlapping the data transfers with query processing.

Figure 2:
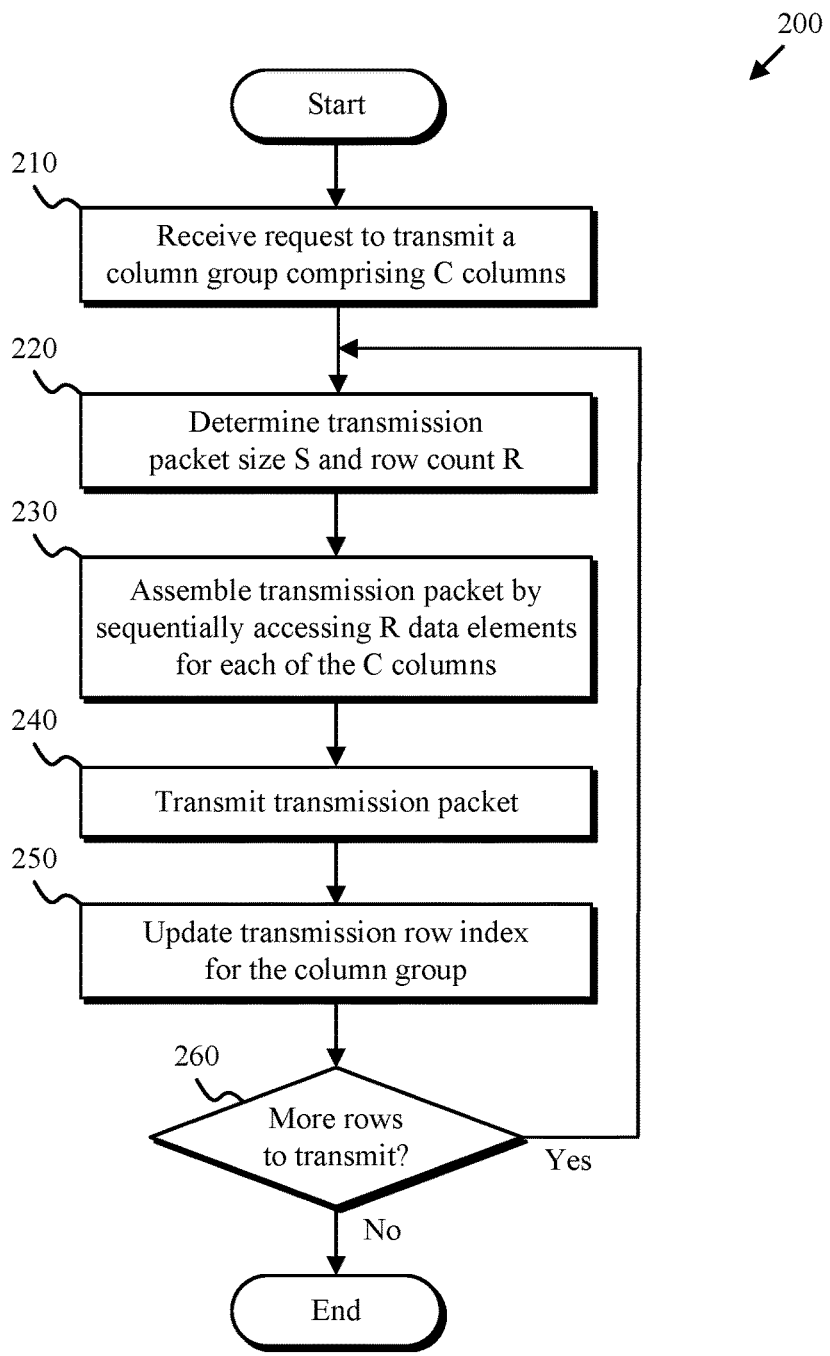
FIG. 2 is a flowchart depicting one example of a column group transmission method in accordance with at least one embodiment of the present invention.

FIG. 2 is a flowchart depicting one example of a column group transmission method 200 in accordance with at least one embodiment of the present invention. For the sake of simplicity, the methods disclosed herein primarily discuss transmitting an entire column group between source nodes and target nodes. However, the described methods may also be conducted on column group subsets (e.g., sets of contiguous rows) that are associated with particular computing nodes.

As depicted, the method 200 includes receiving (210) a request to transmit a column group, determining (220) a transmission packet size, assembling (230) a transmission packet, transmitting (240) the transmission packet, updating (250) a transmission row index, and determining (260) whether additional rows need to be transmitted. The column group transmission method 200 may be conducted within the computing environment 100 or the like.

Receiving (210) a request to transmit a column group may include receiving a message, signal, or some other form of communication indicating the particular column group that is to be transmitted to another physical or virtual node. In certain embodiments, one or more parameters that indicate the column group that is to be transferred are communicated and received in conjunction with a function call.

Determining (220) a transmission packet size may include determining an optimal packet size S or size range ($S_1$-$S_2$) for transmitting column group data over a communication link or network. Factors relevant to determining an optimal packet size or size range include network throughput, network latency, and processing overhead. In some embodiments, the transmission packet size corresponds to an integer multiple of the (maximum) data length $L_{row}$ of a column group row. For example, a packet row count R may be computed according to the equation:

$$R = \text{floor}(S_2/L_{row}) \tag{1}$$

Assembling (230) a transmission packet may include sequentially transferring R data elements for each column in the column group (i.e., serially executing row order transfers for each column in succession) into a transmission buffer. In certain embodiments, high data rate sequential transfers that transfer R data elements as a whole from each column in the column group may be accomplished by execution of specialized computer instructions. The data elements and/or the transmission buffer may reside sequentially in main memory to maximize cache efficiency and facilitate increased data transfer rates.

Transmitting (240) the transmission packet may include transmitting the data assembled in the transmission buffer. In other embodiments, the assembling operation 230 is omitted and the transmitting operation 240 is accomplished by sequentially transferring R data elements for each column in the column group directly to a network interface port.

Updating (250) a transmission row index may include incrementing a variable that indicates the next row to be transmitted. Determining (260) whether additional rows need to be transmitted may include comparing the transmission row index to a maximum row index. If no additional rows need to be processed the depicted method terminates. If additional rows need to be processed, the depicted method loops to the determining operation 220 in order to determine the size of the next transmission packet. In other embodiments, the size of transmission packets is fixed and the method loops directly to the assembling operation 230.

Figure 3:
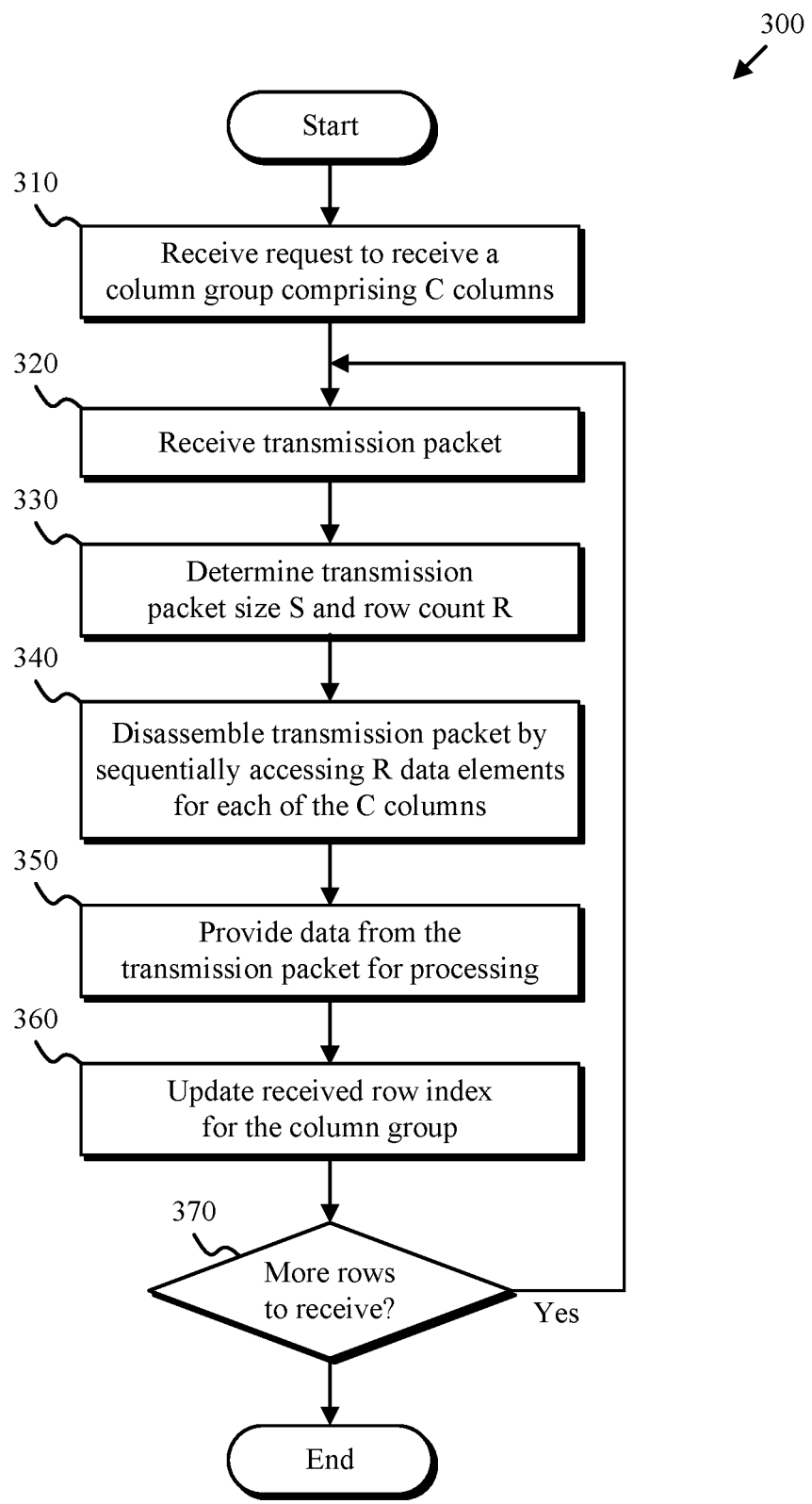
FIG. 3 is a flowchart depicting one example of a column group reception method in accordance with at least one embodiment of the present invention.

FIG. 3 is a flowchart depicting one example of a column group reception method 300 in accordance with at least one embodiment of the present invention. As depicted, the method 300 includes receiving (310) a request to receive a column group, receiving (320) a transmission packet, determining (330) a transmission packet size S, disassembling (340) the transmission packet, providing (350) data from the transmission packet for processing, updating (360) a received row index, and determining (370) whether additional rows need to be received.

Receiving (310) a request to receive a column group may include receiving a message or other form of communication indicating the column group that is to be received from another physical or virtual node. For example, a message may be received from a transmitting node or a controlling node within a column-oriented processing system. In certain embodiments, one or more parameters that indicate the column group that is to be received are communicated via a function call.

Receiving (320) a transmission packet may include receiving a column group data message from another processing node. Determining (330) a transmission packet size S may be conducted similarly to the determining operation 220. Alternately, the transmission packet size S and/or a packet row count R are explicitly indicated in each received column group data message or deduced from the size of such messages. For example, for column groups with fixed length data the packet row count may be computed according to the equation:

$$R = \text{floor}((S_{message} - S_{overhead})/L_{row}) \tag{2}$$

where $S_{message}$ is the size of the received message, $S_{overhead}$ is the size of overhead information, and $L_{row}$ is the data length of a column group row. Methods to calculate $L_{row}$ and R for variable length data columns are discussed subsequently in this specification.

Disassembling (340) the transmission packet may include sequentially transferring R data elements for each column in the column group (i.e., serially executing row order transfers for each column in succession) from a receiving buffer into working memory. In certain embodiments, high data rate sequential transfers that transfer R data elements as a whole for each column in the column group may be accomplished by execution of specialized computer instructions. The data elements and/or the receiving buffer may reside sequentially in main memory to facilitate increased data transfer rates.

Providing (350) data from the transmission packet for processing may include informing a processing thread that the data in the column group data message is available in working memory.

Updating (360) a received row index may include incrementing a variable that indicates the next row to be received. Determining (360) whether additional rows need to be received may include comparing the received row index to a maximum row index. If no additional rows need to be received the depicted method terminates. If additional rows need to be received, the depicted method loops to the receiving operation 320.

FIGS. 4A-4C are text diagrams depicting one example of column group data 400 processed in accordance with at least one embodiment of the present invention. As shown in FIG. 4A, column group data 400A that resides on node 'A' and column group data 400B that resides on node 'B' each include a 'name' column, an 'age' column, and an 'insured' column. As shown in FIG. 4B, subsets of the column group data 400A and the column group data 400B may transferred column by column into a transmission buffer resulting in a column group data packets 410A and 410B. To facilitate processing on a node 'C' the column group data packets 410A and 410B may be transferred from nodes 'A' and 'B' respectively resulting in received column group data packets 420A (i.e., 'A1', 'A2' and 'A3') and 420B (i.e., 'B1', 'B2' and 'B3').

One of skill in the art will appreciate that unless a query is enforcing some specific type of ordering, the data packets 420 (i.e., 420A and 420B) may be concatenated in an arbitrary order such as time of arrival. For example, in the depicted scenario the received column group data packets 420A and 420B are not perfectly interleaved (e.g., due to variations in processing time and network latency). If a specific order must be maintained, the data packets 420A and 420B would not be interleaved but would be received and processed separately.

As shown in FIG. 4D, the received column group data packets 420 may be unpacked into columns and grouped into processing groups. For example, the received column group data packets may be unpacked by sequentially transferring R data elements for each column from a receiving buffer to a particular location in working memory (e.g., cache memory) for conducting column-oriented query processing.

One of skill in the art will appreciate that the embodiments disclosed herein enable efficient and highly parallel data exchange over the network in a column-oriented storage and/or processing system such an MPP shared nothing column store, while also avoiding the processor overhead and cache inefficiency inherent in common data exchange approaches. During columnar processing, the efficiency of the columnar processing on each node of the MPP system is maintained by using a processing group (i.e., vector) stride size optimized for local processing and a transmission packet stride size optimized for network communications rather than an averaged "best fit" stride size that trades off processing speed for network efficiency.

For example, when a processing group is exchanged over the network it may be serialized into an intermediate format which is both cache efficient to serialized and de-serialize, but is also optimized to minimize network latencies and avoid any bottlenecking or stalling of the MPP parallelism. Rather than flowing the column vectors as-is, or attempting to transpose them into a row oriented format, the processing group may be decomposed into transmission packets that may, or may not be an aligned subunit of the processing group.

In some embodiments, each node maintains multiple transmission and receiving buffers and/or the transmission and receiving buffers are sized so that multiple transmission packets can be concurrently sent and received. Furthermore, network flow control may be utilized to avoid congestion and stalling. For example, a paired source node and a target node may use network windowing. Consequently, the source node may repeatedly transmit multiple (windowed) transmission packets before a packet acknowledgement is received for a previous transmission packet of the multiple (windowed) transmission packets. The maximum windowed packet count may correspond to a transmission buffer size or a receiving buffer size. Utilizing such a network flow control approach may improve network utilization while avoiding congestion.

A key attribute of the transmission packets is that they contain data from all columns in the column group and thereby form atomic units that can be processed independently from other transmission packets on a receiving node. Further the transmission packets are completely decoupled and independent from the processing groups and can therefore be dynamically selected to be optimally sized to minimize latency based on the physical network fabric used in the computing environment.

The combination of atomicity and network optimization enables receiving data from a decomposed processing group from an arbitrary node and processing the received data immediately. Furthermore, since the transmission packets are atomic (i.e., are self-contained with all the needed columns), the data within the transmission packets can also be re-combined or coalesced arbitrarily into larger processing groups without any need to reform the original processing groups from the sending nodes. Furthermore, different sending nodes may use different packet sizes.

This approach enables us to interleave atomic transmission packets from all incoming streams in parallel when forming processing groups on the target node. The benefits are at least twofold; firstly, since data from packets from multiple sending nodes are concatenated rather than waiting for multiple packets to arrive from a single node, both sending and receiving nodes are able to keep running in parallel without blocking, multiplying their processing efficiency and maximizing the scalability of processing across many servers. Secondly, because we are drawing network optimized transmission packets from multiple parallel producers we minimize the latencies we will incur waiting for data to arrive.

In addition to maximizing scalability and minimizing network latencies, an intermediate columnar vector format can be generated using cache efficient column-wise access prior to sending the transmission packets the network. Similarly, the intermediate format back can be aggregated into processing groups on the receiving side using a similar cache efficient access method, maximizing the throughput we can drive given the processor capacity on an MPP cluster.

There are two special situations that may occur when transforming a processing group of columnar vectors into an intermediate transmission format for serializing into a network buffer.

The first occurs when broadcasting a processing group to all nodes (e.g., servers in a cluster) in a column-oriented system. In this case the columnar vectors within the processing group are sent in their entirety to all nodes in the system. For example, such a broadcast could occur in conjunction with performing a join operation on a small dimension table.

Given a target network buffer size optimized to maximize throughput and minimize latency, a column vector length or row count R for the transmission packet could be determined such the all of the column vectors for the column group to be processed would fit within that buffer. See, for example, equation 1. In some scenarios, the some of the columns may have variable length data and/or compressed data. In those scenarios, the size of each row could be calculated and iteratively summed until the sum exceeds the optimum buffer size or buffer size range. The column vector length or row count R for the transmission packet would then be selected to be one less than the number of rows summed that exceed the optimum buffer size or buffer size range.

In the above situation, the size of each row in a processing group may be calculated efficiently by using a size vector having the same length as the columns of the processing group. The size of each element in each column could be added to the size vector in column order in order to minimize cache misses. Such an approach limits cache misses [to (column vector size/cache unit size) misses] for each column. This is in contrast to row-wise traversal which could potentially incur (column vector size*column group size) cache misses. Once the size vector is computed, the size vector may also be iteratively summed in place to compute the size of the transmission packet that uses R rows. The iterative summing may be terminated once the size of the transmission packet that uses R rows exceeds the optimum buffer size or buffer size range. Similar to the iterative summing process described in the previous paragraph, the column vector length or row count R for the transmission packet would then be selected to be one less than the number of rows summed that exceed the optimum buffer size or buffer size range.

The actual serialization of the processing group to the transmission buffer may be made cache efficient by copying contiguous column vectors into the buffer sequentially rather than transposing into a row-oriented format. Similar to generation of the size vector above, copying contiguous column vectors minimizes accesses to cache units (e.g., lines or pages) on both the source node and the target node.

Since an integral number of rows are included in the transmission packet, the data in the transmission packet can be processed immediately on the receiving node without incurring additional latency waiting for additional data. Consequently, processing can begin on a received transmission packet while the subsequent packet is being received resulting in processing that is overlapped with data transmissions (on both the source node and the target node).

A second case we need to handle is when we need to perform hash re-partitioning of a set of columnar vectors based on a specific hash key and distribute partitioned work units to different nodes based on this hashing. This would commonly occur when we need to re-partition a large dimension or fact table when processing a join. To accomplish this we first allocate a separate bit vector for each node that we will be sending to (where the bit in the vector indicate whether a corresponding row in the work unit will be sent to that node). Next we iteratively apply our hash partitioning function against the partitioning key (which consists of one or more columns) traversing the work unit and marking the bit value in the bit vector corresponding to the node each row hashes to.

Because the bit vectors require a lot less memory than storing a vector of hash values they provide a relatively cache efficient mechanism for filtering the column values that correspond to a particular node. We only need to do a single traversal of the key columns to build the bit vector for a given node, and we can then traverse the bit vector as many times as needed to filter out the values we need for a given column.

To perform the actual hash re-partitioning of the work unit we then apply the same algorithm described earlier that we apply to serialize column data into transmission packets except that when reading data values from the source columns we utilize the bit vector to filter out only the qualifying rows for the target node and we perform our calculations based on the number of bits in the bit vector rather than on every row contained in a given column (note that we can easily store the count of bits when generating the bit vector so this becomes a simple O(1) lookup operation).

We perform this re-partitioning against each node in sequence which enables us to write out the transmission packet column data sequentially and minimize the potential for cache misses (as compared to processing all nodes simultaneously which would potentially have us accessing a different cache line on the writing side for each row being processed). As a consequence we must iterate through the source column once for each node, but we utilize the bit vector to filter and read only those values that apply to the target node.

Having serialized our columnar vector data into a network buffer, we will next then transmit the buffer over the physical network to the desired targets (all nodes for the broadcast case, or single node for the re-partitioning case). On the receiving end we then need to de-serialize the incoming network buffer and then coalesce transmission packets that we receive back into a full-sized work unit that we can then use for processing.

In both the broadcast and hash repartitioning case the de-serialization process on the receiver is the same. The receiver will draw transmission packets from across all incoming nodes, drawing in round robin fashion when transmission packets are available on all nodes, and otherwise receiving transmission packets as they arrive until sufficient transmission packets have been received to reconstitute the original processing group size.

Once sufficient transmission packets are received they will be coalesced into a single larger work unit by copying the column data sequentially from each transmission packet into a full sized column vector allocated in a new destination work unit. Fixed length column vectors will be copied as-is, while variable length column vectors will be expanded back into destination vectors of full fixed length values. Since this processing proceeds column-wise it will once again be cache efficient as cache lines will be read sequentially from the transmission packets and written sequentially into destination vectors.

To maximize network bandwidth we introduce the concept of a "common" dictionary in our MPP shared nothing database. Rather than producing independent table column dictionaries on each node of the MPP system at table load time and attempting to maintain compression by exchanging data about the column dictionaries at query execution time, we instead add an additional global merge and distribution phase during the table load or ingest processing. The global merge phase consists of taking the statistical frequency histogram data generated on each individual partition that is used to generate a given column compression dictionary and flowing it back to the node that is coordinating the data load and dictionary generation where it is merged with the histograms from the other nodes to produce a single merged histogram that represents compression frequency data across all the partitions. This single histogram is used to produce a final column dictionary which is then distributed/broadcast back to all nodes in the system where it is stored as the local column dictionary for that column on that node. This produces an independent but common dictionary for the column across all nodes, allowing for data to remain in its native compressed form when exchanged over the network but otherwise to be interpreted as it if was compressed using the node's local compression dictionary. This both effectively multiplies the available network bandwidth without any additional processing overhead or need to exchange additional metadata, but it further allows the data to remain in its compressed form throughout query processing which is particularly powerful for columnar engines that leverage the concept of actionable compression (the ability to perform joins or predicate evaluation without decompressing data values) as is the case with IBM's BLU.

We apply a final optimization to maximize our network bandwidth when transmitting data vectors compressed using our common dictionary. For processing efficiency compressed column data is often materialized in memory as vectors of fixed length types. This however trades off compression benefits as frequency based compression uses variable length codes to achieve storage savings and these are now being stored into larger fixed sized types. In addition to this penalty, uncompressed column values are often stored in a separate vector from encoded values due to their larger space requirements, and for speed of access this vector is usually sparse, consuming extra space.

For encoded column vectors we apply a run length encoding transformation where we use a prefix of several bits to represent one of several word sizes for each value in the vector (for example 2 bits representing 4, 8, 16, and 32 bit words). When we pack the values into the intermediate vector format for transmission we apply the same techniques as for other variable length data except that we copy the prefix followed by the code value packed into the corresponding word size saving the excess space. When unpacking the values we rematerialize the values into full sized words once again.

For uncoded value vectors we use a one bit prefix to represent whether a value is present or not, and append values only where present leaving no unused space in the vector. When unpacking we copy the values back into their appropriate locations in the sparse destination vector.

One of skill in the art will also appreciate that many variations of the disclosed embodiments, as well as other embodiments, may be implemented that fit within the scope of the claimed invention.

Figure 5:
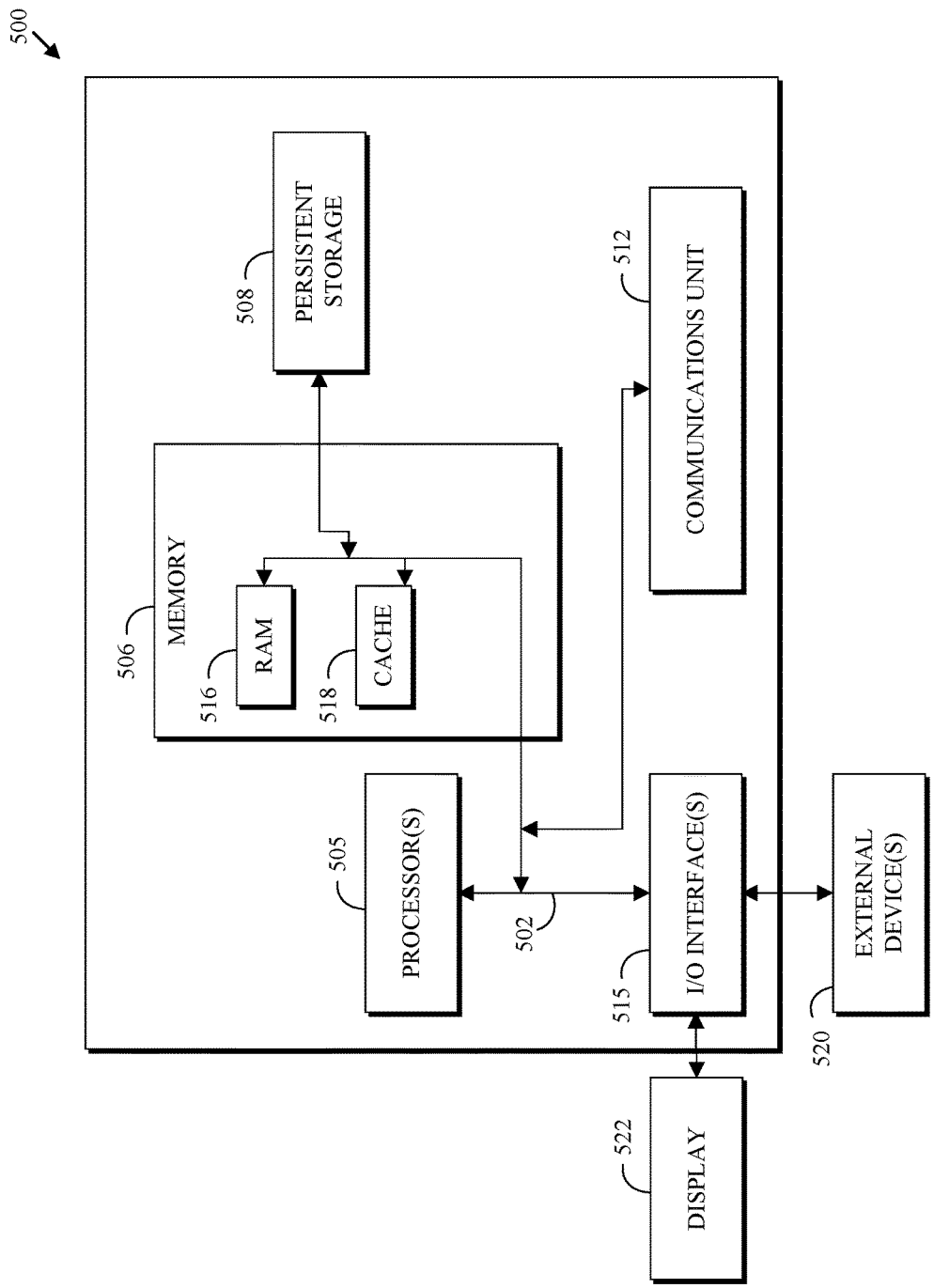
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:

receiving a request to transmit column group data to a target node, the column group data comprising C selected columns within a column-oriented data table where C is greater than 1 and less than the number of columns in the column-oriented data table;

determining an optimal packet size or packet size range for transmitting data to the target node;

determining a transmission row count R, corresponding to the optimal packet size or packet size range, for transmitting the column group data to the target node where R is greater than 1; and transmitting a transmission packet comprising R sequentially-ordered data elements for each of the C selected columns to the target node.

2. The method of claim 1, wherein the R sequentially-ordered data elements for each column reside sequentially within memory.

3. The method of claim 1, wherein R is selected to achieve one or more of preventing stalling, supporting serialization, increasing transmission throughput, and decreasing transmission packet latency.

4. The method of claim 1, wherein transmitting the transmission packet to the target node comprises sequentially accessing R data elements for each of the C selected columns.

5. The method of claim 1, further comprising repeatedly transmitting transmission packets comprising R data elements for each of the C selected columns until all of the column group data is transmitted to the target node.

6. The method of claim 5, wherein repeatedly transmitting transmission packets comprises transmitting multiple windowed transmission packets before a packet acknowledgement is received for a previous transmission packet of the multiple windowed transmission packets.

7. The method of claim 6, wherein a maximum windowed packet count for windowed transmission packets corresponds to a transmission buffer size or a receiving buffer size.

8. The method of claim 1, wherein the data elements within the column-oriented data table are compressed data elements.

9. The method of claim 1, wherein transmitting the transmission packet to the target node comprises assembling the transmission packet within a transmission buffer.

10. A method, executed by one or more processors, the method comprising:
receiving, at a target node, a request to receive column group data, the column group data comprising C selected columns within a column-oriented data table where C is greater than 1 and less than the number of columns in the column-oriented data table;
determining an optimal packet size or packet size range for transmitting data to the target node from a source node;
determining a transmission row count R, corresponding to the optimal packet size or packet size range, for receiving the column group data where R is greater than 1; and
receiving a transmission packet comprising R sequentially-ordered data elements for each of the C selected columns.

11. The method of claim 10, further comprising processing data from one or more previously received transmission packets concurrent with receiving the transmission packet.

12. The method of claim 10, further comprising repeatedly receiving transmission packets comprising R data elements for each of the C selected columns until all of the column group data is received.

13. The method of claim 10, wherein receiving the transmission packet comprises sequentially storing R data elements for each of the C selected columns.

14. The method of claim 10, further comprising assembling transmission packets received from multiple transmitting nodes into a processing group.

15. The method of claim 10, wherein R is selected to achieve one or more of preventing stalling, supporting serialization, maximizing transmission throughput, and minimizing transmission packet latency.

16. The method of claim 10, wherein the R data elements for a column reside within memory.

17. A column-oriented data processing system comprising:
a source node and a target node;
the source node configured to receive a request to transmit column group data to the target node, the column group data comprising C selected columns within a column-oriented data table where C is greater than 1 and less than the number of columns in the column-oriented data table;
determining an optimal packet size or packet size range for transmitting data to the target node from the source node;
the source node further configured to determine a transmission row count corresponding to the optimal packet size or packet size range, for transmitting the column group data to the target node where R is greater than 1; and
the source node further configured to transmit a transmission packet comprising R sequentially-ordered data elements for each of the C selected columns to the target node.

18. The column-oriented data processing system of claim 17, wherein the target node is configured to process data from one or more previously received transmission packets concurrent with receiving the transmission packet.

19. The column-oriented data processing system of claim 17, wherein the source node is configured to store elements for each column sequentially within memory.

20. The column-oriented data processing system of claim 19, wherein the source node is configured to transmit the transmission packet to the target node by sequentially retrieving R data elements from the memory for each of the C selected columns.

* * * * *